(12) United States Patent
Lindermeir et al.

(10) Patent No.: US 6,423,218 B1
(45) Date of Patent: Jul. 23, 2002

(54) POND INSERT WITH PUMP

(75) Inventors: Wolfgang Lindermeir, Untermarchtal; Reiner Haeufele, Laupheim, both of (DE)

(73) Assignee: Gardena Kress + Kastner GmbH (DE)

( * ) Notice: Subject to any disclaimer, the term of this patent is extended or adjusted under 35 U.S.C. 154(b) by 0 days.

(21) Appl. No.: 09/451,626

(22) Filed: Nov. 30, 1999

(30) Foreign Application Priority Data

Dec. 19, 1998 (DE) .......................................... 198 58 904
May 21, 1999 (DE) .......................................... 199 23 354

(51) Int. Cl.[7] .............................. B01F 3/04; F04D 29/00; C02F 1/74
(52) U.S. Cl. ................. 210/170; 210/198.1; 210/416.1; 417/187; 417/423.3; 261/77; 261/DIG. 75; 239/23
(58) Field of Search ............................... 210/170, 198.1, 210/220, 263, 416.1, 460, 463, 747; 261/4, 40, 77, DIG. 75; 417/182, 187, 423.3, 423.9; 415/121.2; 239/23

(56) References Cited

U.S. PATENT DOCUMENTS

| | | | |
|---|---|---|---|
| 2,483,777 A | | 10/1949 | Lange |
| 2,822,329 A | * | 2/1958 | Griffith |
| 3,829,247 A | * | 8/1974 | Edmonson |
| 3,904,393 A | * | 9/1975 | Morse |
| 3,957,633 A | * | 5/1976 | Gatti et al. |
| 3,973,930 A | | 8/1976 | Burgess |
| 4,226,719 A | * | 10/1980 | Woltman |
| 4,242,289 A | * | 12/1980 | Blum |
| 4,645,603 A | * | 2/1987 | Frankl |
| 4,654,603 A | | 3/1987 | Cox |
| 4,911,836 A | * | 3/1990 | Haggerty |
| 5,215,656 A | | 6/1993 | Stoneburner |
| 5,403,522 A | * | 4/1995 | Von Berg |
| 6,106,225 A | * | 8/2000 | Enns |
| 6,155,794 A | * | 12/2000 | Wu |

FOREIGN PATENT DOCUMENTS

| | | |
|---|---|---|
| DE | 2 50 217 | 8/1912 |
| DE | 2 357 939 | 6/1974 |
| DE | 7613069 U | 9/1976 |
| DE | 76 13 069 | 9/1976 |
| DE | 7809116 U | 7/1978 |
| DE | 4025498 A | 2/1992 |
| DE | 41 01 641 | 7/1992 |
| GB | 2315821 A | 2/1998 |

* cited by examiner

*Primary Examiner*—Duane Smith
*Assistant Examiner*—Fred Prince
(74) *Attorney, Agent, or Firm*—Akerman Senterfitt

(57) ABSTRACT

A pond insert more particularly intended for insertion in a garden pond is described and which has at least one electromotively driven pump (2) The pump has an inlet connection and two intercommunicating outlet connections (5, 6), whereof one is preferably oriented horizontally and one vertically. The pump can be fixed in a basket-like container (3), which can be filled with a weighting material such as gravel or the like for improving the stability of the pond insert.

50 Claims, 3 Drawing Sheets

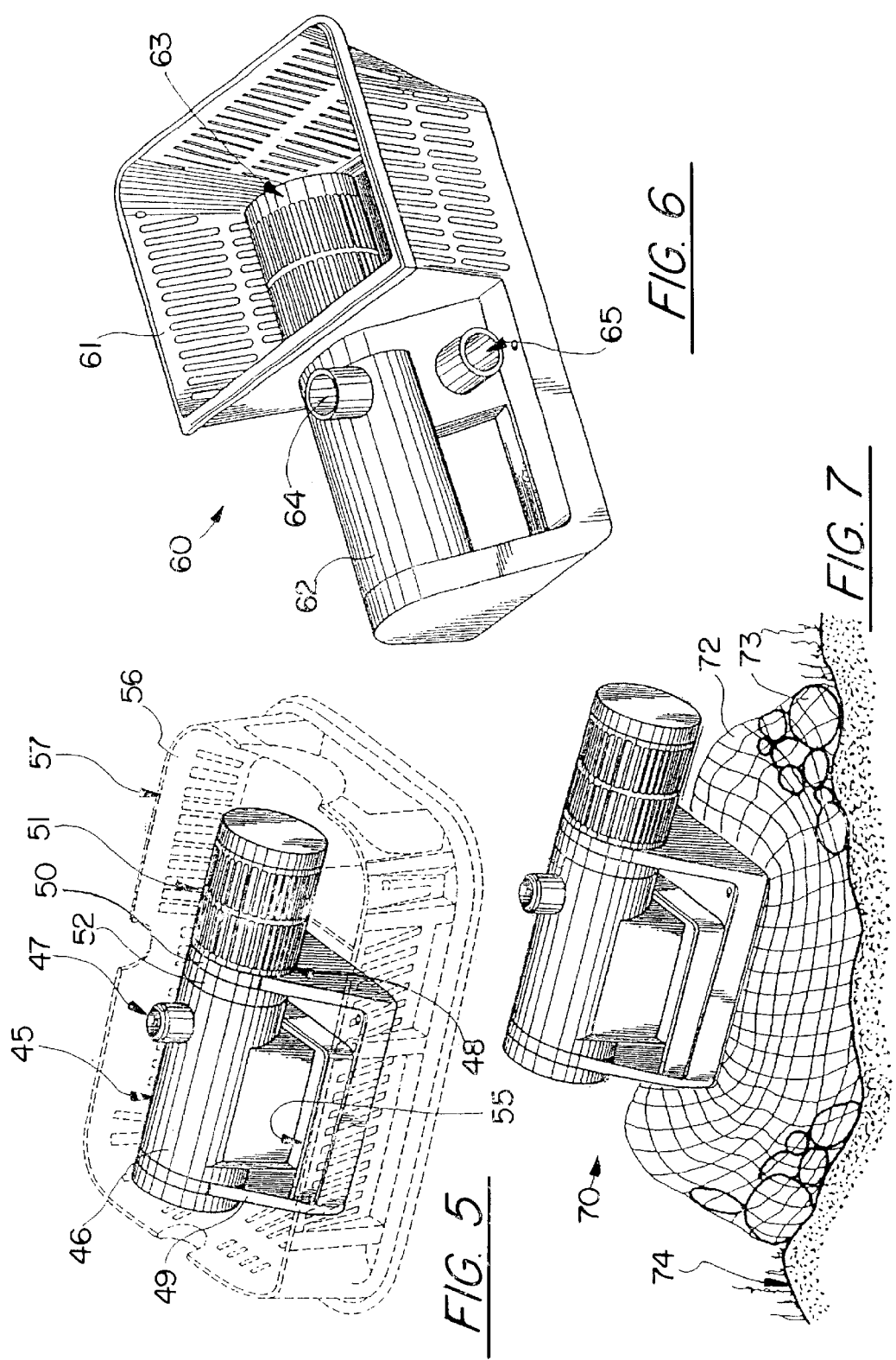

POND INSERT WITH PUMP

The invention relates to a pond insert device or pond insert, particularly for insertion in a garden pond, having at least one motor-driven pump.

Pond pump systems of this type generally have an electromotively driven pump and are e.g. used for operating a fountain or the like with water collected in the garden pond. Alternative uses occur e.g. in connection with pond ventilation or aeration or with regards to the circulation and filtering of the pond water. For this purpose the water can be drawn in in the vicinity of an inlet connection of the pump and can be delivered through an outlet connection under a pressure raised in accordance with the particular use.

The problem of the invention is to provide a pond insert of the afore-mentioned type with a high service or use value.

This problem is solved by a pond insert having the features of claim 1. Advantageous further developments are given in the subclaims, whose wording is made by reference into part of the present description.

In the case of a pond insert according to the invention, the preferably electromotively driven pump has on the outlet side a first outlet connection and additionally at least one second outlet connection. Such a construction with several, preferably two separately usable outlet connections represents a considerable extension of the use possibilities of pond pumps. Firstly, when necessary, several, optionally different functions can be simultaneously fulfilled with a single pump. Secondly the outlet connections can be designed in different ways with regards to the dimensioning, connection possibilities, passage cross-sections or passage quantities, etc., so that there are more variable connection possibilities with a better adaptation to desired functions. Several connections located at different points of the pump and optionally directed into different directions also create for a user more scope or latitude regarding the installation of such pond inserts and facilitate the connection of optionally provided, further functional units to the outlet connections.

It can in particular be provided that the first outlet connection and a second outlet connection are oriented or orientable substantially at right angles to one another and preferably one outlet connection is oriented or orientable substantially parallel and the second outlet connection substantially perpendicular to a standing surface of the pump. Thus, in the case of a regular standing position of the pond insert, one connection is oriented substantially vertically upwards and the other substantially horizontally.

According to a further development, at least one of the outlet connections is variably orientable relative to a standing surface of the pump. As a result of the preferably continuously monodimensionally or multidimensionally variable orientation over a suitable angular range, in simple manner it is e.g. possible to vary the projection direction of a connected jet or the connection can be advantageously oriented relative to a hose to be connected in such a way that the hose is connectable without an inadmissibly great bending or kinking. The variable orientation can e.g. be achieved in that the connection takes place to a flexible line portion fixable with respect to its bending position. Preferably, at least one outlet connection is provided on a preferably substantially dimensionally stable, water-carrying extension connected in directionally variable manner to a discharge connection socket of the pump. Preferably the discharge connection socket and the extension are connected by means of a water-carrying ball joint. The ball joint is in particular held frictionally in a position variable by overcoming the frictional force. The variable orientability of an outlet connection can also be advantageous with pumps having only a single discharge connection.

Another possibility for implementing a variable orientation of one or more discharge connections is provided in a further development in that with the pond insert is associated a standing foot means, which defines a standing surface for the pump and to which the pump can be fixed in movable and/or detachable manner. The standing foot means or standing platform can be so constructed that the pump is rotatable or pivotable with respect to the standing foot about a substantially standing surface-parallel axis. Thus, a connection socket or outlet connection oriented transversely to the pivoting axis and provided on the pump can be modified with respect to its orientation in space by pivoting the pump in the receptacle of the standing foot means. The receptacle for the pivotable equipment part in the standing foot means can e.g. have several locking positions for pivoting the equipment part preventing an unintentional pivoting. A standing foot can be an integral component of the pump or its casing.

According to a further development, in the case of at least one of the outlet connections, the flow quantity is adjustable independently of the pump drive. This permits a variable water delivery, even when using inexpensive pumps having a constant delivery. In particular, the passage cross-section of at least one outlet connection can be variable, preferably in a continuous manner, e.g. by means of an associated, preferably manually operable regulating valve.

It can be particularly advantageous if the first and the second discharge connection are so constructed in intercommunicating manner, that the flow quantity through a discharge connection is adjustable by regulating the flow quantity or cross-section of the other discharge connection. Thus, it is possible to operate one of the discharge connections with a constant flow cross-section and modify or adjust the flow quantity through said discharge connection, which can in particular lead to a fountain or the like, in such a way that the flow cross-section or quantity of the other discharge connection is e.g. variable through said regulating valve. In this case the other discharge connection acts as a bypass, by means of which in the case of a constant pump capacity the flow can be influenced by a connection with a constant cross-section. The regulating valve can, by means of a line or tube, be removed from the pump or the influenced outlet connection, so that e.g. the pump with a smaller line length and consequently with a lower pressure loss can be provided with one discharge connection on a fountain at a difficultly accessible place in the pond and an optionally flexible line can lead from the second discharge connection to the regulating valve at an easily accessible place in the pond. From the latter the delivery can be modified through the first discharge connection according to the bypass principle. If the cross-sectionally variable outlet connection is easily accessible, the regulating valve used for modifying the cross-section can be fitted, e.g. screwed directly thereto. It is also possible to construct bothor all the pump outlet connections with a variable flow cross-section, e.g. by associating corresponding regulating valves.

According to a further development, the inlet connection is constructed as an inlet socket with a screw thread or a coupling connection. Alternatively or additionally at least one discharge connection can be constructed as a discharge socket with a screw thread or a coupling connection. This makes it possible in simple manner, if necessary, to operate the pump for varying functions and/or with other operating parameters. For example, one pump discharge connection can be further branched and/or by means of a line, particularly a flexible line, such as a hose, laid or located at a point further removed from the pump. By means of an inlet connection equipped with a screw or coupling connection, e.g. a water source outside the pond can be connected. Thus, e.g. by means of a higher feed pressure, the delivery at the pump outlet and therefore e.g. the projection height of a fountain can be changed.

An advantageous use of a pump with several, particularly two outlet connections can consist of the simultaneous operation of two functions, e.g. the operation of a fountain or the like by means of one of the discharge connections and a preferably simultaneous pond aeration by means of another discharge connection. The pond aeration can advantageously be brought about in that on at least one of the discharge connections is fitted a jet suction nozzle means operating in the manner of a water jet pump and having at least one connection for an air intake oriented transversely to the jet direction and which can project over the water surface. Air is drawn in in accordance with the known water jet pump principle.

According to an advantageous development the pond insert has at least one container connected or connectable to a casing fixed to the pump for receiving in particular pourable weighting material such as gravel, stones, etc. The construction of the pond insert with a container for receiving the weighting material makes it unnecessary for the user to fill a separate container with weighting material, which is a method already used, but which is cumbersome and which then involves placing a pond insert in the container on or in the weighting material. As a result of the advantageous structural combination of pump and container, which can be brought about by a non-detachable, but preferably by a detachable, rigid connection, handling is significantly simplified. In particular, a container can be matched to the pump provided for the connection as regards dimensions, arrangement of connections, weight and/or the like.

The container can e.g. have a reception space for weighting material in a base part of the pond insert. According to a further development, the container has a basket-like construction. The pump, at least with the area of the inlet connection, can be positioned substantially within the container or the connection can face the container. Preferably the container has side walls surrounding the pump, whose height is adapted to that of the pump connected to the container in such a way that the pump can be substantially completely covered by loose material and/or weighting material received in the container. As a result, for an outside observer, the pump is not visible or is only visible by a discharge connection socket possibly projecting over the weighting material, so that a pond equipped with the insert has a natural appearance. Preferably, the container upper edge is higher than the essential part of the received pump or its casing.

In the case of embodiments with a container fillable with pourable weighting material, advantageously with the container filled, an inlet opening of the pump serving as an intake opening is located within the weighting material or is at least directed against it. Thus, a filter mechanism upstream of the inlet opening is formed and the weighting material can simultaneously serve as an optionally coarse prefilter for the liquid drawn in. The actual container or its wall which is broken at several points can fulfil a prefilter function and as a result of the structure of the container wall material and its mesh size or opening width, the fineness of the filtering can be determined.

According to a further development the container is permanently shape-variable and preferably the container is formed by a netting or sack. The container can be filled with the weighting material by means of an opening.

The shape-variable container is preferably constructed in such a way that it is placed or is placeable below a standing surface of the pump. Such an embodiment is particularly advantageous for the positioning of a pond insert at a point with a non-horizontal and/or non-planar substrate. As a result of the shape adaptability or variability of the container, the weighting material can be shaken into place in the container in such a way that its underside is adapted to the substrate and its top is oriented in desired manner and particularly roughly horizontally with the standing surface of the pump.

These and further features can be gathered from the claims, description and drawings and the individual features, both singly or in the form of subcombinations, can be implemented in an embodiment of the invention and in other fields and can represent advantageous constructions.

FIG. 5 is another pond insert, in which a pump is placed in a standing foot so as to be pivotable about its longitudinal axis, together with a basket container shown in broken line form for receiving the pump system and weighting material.

FIG. 6 another pond insert, in which only the inlet side of a pump with the inlet connection surrounded by a filter housing is located within a basket-like container.

FIG. 7 is a pond insert with a pump, which stands on a floor adjusting container formed by a rock-filled netting.

Figure 1:
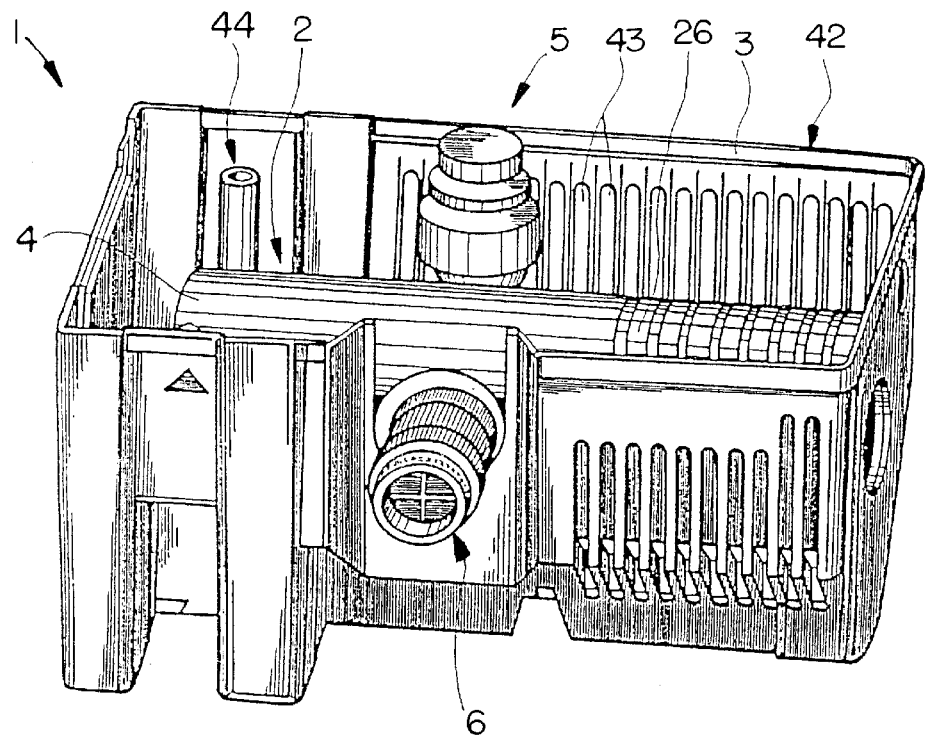
FIG. 1 is an inclined perspective view of an embodiment of an inventive pond insert with a pump, which is fixed in a reception basket for weighting material.

The inclined perspective view of FIG. 1 shows a pond insert 1, which can e.g. be installed on the floor or bottom of a garden pond, which has an electromotively driven pump 2, which is substantially completely placed inside a box-like, upwardly open plastic basket container 3. The pond pump 2 firmly connected to the container 3 has a circular cylindrical pump casing 4, whereof a first outlet connection 5 passes out vertically upwards and a second outlet connection 6 substantially horizontally sideways and projects outwards through a U-shaped recess in the vicinity of the front wall of the container. As can be readily gathered from FIG. 2, the connection socket 7 of the first outlet connection 5 is constructed in one piece with the pump casing and connected in sealed manner to an extension 9 by means of a water-carrying ball joint 8. A ball section, outer joint part constructed in one piece with the extension is snapped onto a ball portion, inner joint part constructed in one piece with the outlet connection 7. The ball joint parts bidimensionally pivotable against one another by a total of approximately 50° can be sealed against one another by an O-seal 10 passing round a circumferential groove of the inner joint part. The two parts of the ball joint are held in a set position by a static frictional force, which secures against unintentional twisting and for an intentional adjustment of the orientation of the extension 9 with respect to the pump casing or the second connection 6 can be manually overcome. As a result it is possible in the case of an unchanged pump position to carry out a bidimensional change to the discharge direction in the case of an outlet connection fixed by the pump position and thereby bring about a directional deflection within the flow path in the outlet connection. At the joint-remote end of the extension 9 is constructed an external thread 11, which can e.g. be used for connecting a hose to the extension or to the pump outlet 5.

The second pump connection 6 turned with respect to the first pump connection by 90° relative to the pump longitudinal axis 15 has at the end of a connection socket 16 constructed in one piece with the pump casing an external thread 17, onto which is screwed in the example shown a regulating sleeve 18, which has at the pump-remote end portion an external thread by means of which it is e.g. possible to connect a hose or the like to the second pump outlet. In its interior the regulating sleeve has a central sealing cone 20, which faces a frustum-shaped sealing face 21 on the front end of the connection socket 16 and which leads to a regulating valve 22 being formed. By screwing the regulating sleeve 18 onto the threaded connection 17 of the socket 16 it is possible to continuously vary the flow cross-section between the sealing face 21 and the sealing cone 20 and consequently the flow cross-section of the second outlet connection 6, the connection being completely blockable when the regulating sleeve is completely screwed down. The two outlet connections 5, 6 communicate with one another in a direct manner via the interior of the pump casing and the ratio of the flow resistance thereof determines the ratio of the flow quantities. Thus it is e.g. possible to place the pump 2 with a limited line length and therefore with a limited pressure loss, optionally with the constant cross-section outlet connection 5 directly on a fountain at a difficultly accessible location of the pond and to pass a regulating line from the second outlet connection 6 to an easily reachable location on the pond edge, from where in the case of a constant pump delivery or unchanged pump drive the delivery can be controlled through the first outlet 5 on the basis of the above-explained bypass principle. To the second connection or outlet 6 can be connected a bubbling mechanism, a stream course, a flow generator, etc.

Figure 2:
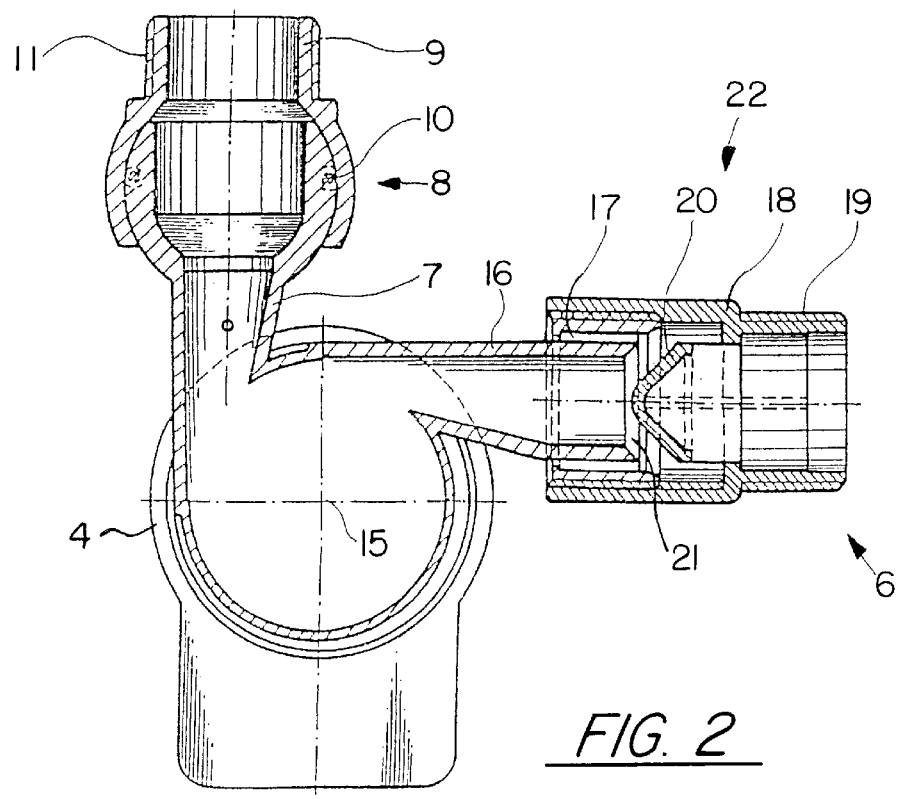
FIG. 2 is a cross-section through the pump outlet connections oriented at right angles to one another and to the pump longitudinal axis, in accordance with FIG. 1.
Figure 3:
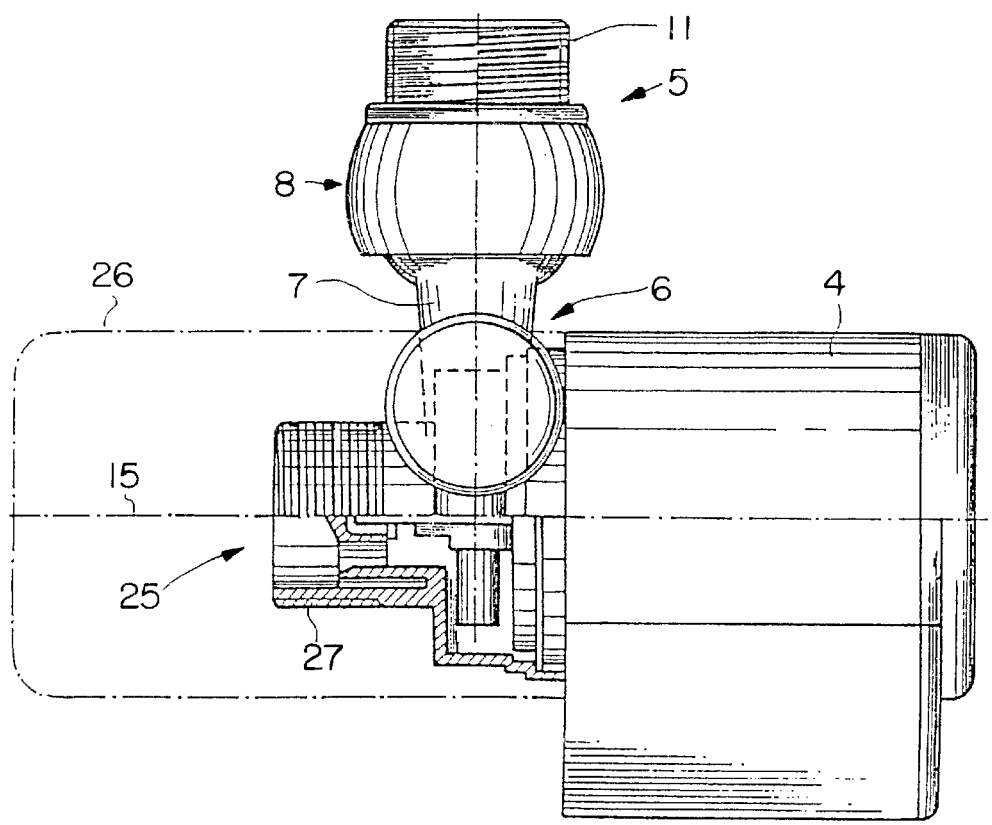
FIG. 3 is a side view in part longitudinal section through the pump of FIGS. 1 and 2.
Figure 4:
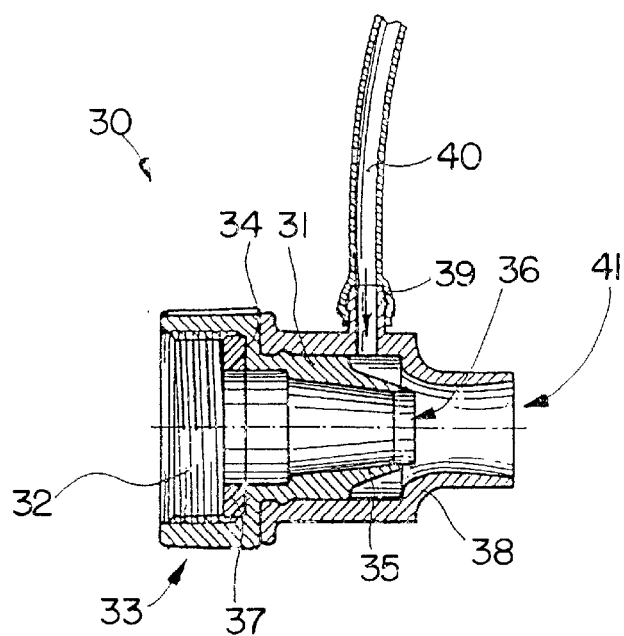
FIG. 4 is a ventilation attachment for a pump outlet connection operating like a water jet pump.

FIG. 4 shows a ventilation or aeration attachment 30, e.g. obtainable as an accessory and which is intended for connection to the horizontal, second outlet connection 6 of the pump shown in FIGS. 1 to 3 and can be screwed, or in other constructions fitted onto the outlet-side thread 19 of the regulating sleeve 18 or directly onto the outlet connection socket 16. The aeration attachment 30 has a water nozzle body 31, which has a threaded portion 33 provided on its outside with longitudinally directed gripping grooves and on its inside with an internal thread 32 and which, accompanied by the formation of an inwardly directed radial shoulder 34, passes into an outlet-side, conically tapering nozzle portion 35, which forms a nozzle orifice 36. Accompanied by the interposing of a seal 37, the nozzle body can be screwed in sealed manner to the outlet end of the connection socket 16 or the regulating sleeve 18. Onto the nozzle portion is snapped in unloseable manner an outer sleeve 38 freely rotatable with respect thereto. The outer sleeve has an inner annular groove cooperating with a torus on the outside of the nozzle portion to prevent loss and for guiding rotation, together with a radially projecting line connection 39 onto which can be unloseably fitted e.g. a plastic air hose 40 passing over the pond water surface. Downstream of the air connection 39 the outer sleeve has a diameter reduction leading to a jet outlet 41 downstream of the nozzle orifice 36. If the jet suction nozzle means 30 is screwed onto the second outlet and the pump is switched on, the delivered water is sprayed at high speed through the nozzle aperture 36 into the following area surrounded by the outer sleeve and into which issues the air tube. The water flowing out at high speed entrains air, which mixes with the water, so that at the jet outlet 41 passes out an air-water mixture, which is dispersed within the pond water and increases its oxygen content. The air required for aeration is continuously drawn through the air hose 40 to the water jet pump 30.

The inlet connection 25 arranged coaxially to the pump longitudinal axis 15 in FIG. 4 is, in the embodiment according to FIG. 1, surrounded by a cup-shaped filter housing or grating 26 with axially parallel longitudinal slots. This prevents the sucking of large articles such as branches, leaves, etc. into the pump. The inlet socket 25 preferably has an external thread 27, which can be used, when the filter housing 26 is removed, for connecting a feedline to the inlet side of the pump. It is also possible to screw conventional cocks of quick coupling systems to the threaded connections of the inlet socket 25 or the outlet socket.

The described pump means can be connected, e.g. screwed or locked to the basket-like container 3 or can be non-detachably connected thereto by a one-piece construction of container and pump casing. The vertical side walls of the rectangular basket container surround the pump on all sides and are so high that the upper edge 42 thereof is spaced above the pump casing and only the directionally variable extension 9 projects over the upper edge. Grip-favourably designed gripping openings on the narrow end faces of the basket container facilitate the handling thereof during insertion in or removal from the pond. On the side surrounding the filter housing 26 the lateral longitudinal walls have vertical longitudinal slots, which when the pond insert is sunk can serve as a coarse filter against floating material moving substantially horizontally against it. The outwardly inverted over side walls in the container part surrounding the pump casing 4 are largely closed and have on their insides vertical reception sleeves 44, which can e.g. be used for fixing lamps or lights to the pond insert, in which a retaining rod, which can carry at its upper end one or more lights, is inserted from above into the same with its lower end adapted to the sleeve 44. The sleeves or receptacles 44 can obviously also be used for the detachable fixing of other articles to be fixed on or in the pond. The basket container 3 of the pond insert can be filled to its upper edge with weighting material such as gravel, stones, rocks, etc. before or after inserting the pond insert, which in easy manner increases the stability of the pond insert on the pond floor or bottom. In addition, the pond optics can be improved, because the weighting material can substantially completely conceal the pump so that it is not visible from the outside. In addition, the loose or weighting material surrounding the filter housing 26 can serve as an additional, coarse prefilter for the intake side.

FIG. 5 diagrammatically shows a pond pump system, in which the pump 45 has a substantially circular cylindrical base 46, from which emanate e.g. two outlet connection sockets, only the upper socket 47 being visible. The base 46 is snapped into upwardly open, pitch circular receptacles 48 of a standing foot means 49. The receptacles 48 cooperate with locking rings 50 of the base in such a way that the latter is pivotable about its longitudinal axis in the receptacles of the standing platform 49 and is locked in several positions. For example, there can be regular locking steps of 5°. In an extension of the base 46 is removably mounted a cup-shaped filter body 51 provided with axial, longitudinal slots and which surrounds the area of the front inlet opening of the pump 45. The delivery can be easily varied e.g. by means of a quantity regulating ring 52. Below the pump base 46 in the standing foot means 49 is provided a reception space 55 for receiving the weighting material, particularly pourable material, e.g. gravel, stones, etc. By weighting the pump by means of the weighting material kept in this reception space, the stability of the installed pump can be improved in a simple, inexpensive and natural manner.

FIG. 5 indicates in broken line form that the pump 45 with its standing foot can be placed in a larger basket-like plastic container 56 completely surrounding the pump. For this purpose either the standing foot means can e.g. be inserted in a correspondingly shaped receptacle of the basket 56 and secured in locking manner, or the standing platform can be constructed integrally with the basket and therefore forms part of the container 56. The upper edge 57 of the plastic basket container 56 is e.g. roughly level with the top of the base or somewhat higher than the latter, so that on filling the container 56 with stones, gravel and/or other weighting material the pump body can optionally be completely covered with the weighting material and consequently the entire pond insert is substantially invisible from outside the pond.

FIG. 6 shows another embodiment of a pond insert 60, in which an upwardly slightly widened, rectangular plastic basket container 61 merely surrounds the inlet side of the pump 62. The inlet side is here visible on the cup-shaped filter housing 63 provided with filtering slots and which surrounds the front inlet socket of the pump. In this embodiment the upper edge of the basket is well above the top of the filter housing. As described, the basket container 61 can be filled with weighting material such as gravel, stones, etc., the filling of the container inter alia bringing about an improvement of the stability of the pond insert. Particularly in the case of complete filling of the basket 61 and corresponding complete covering of the filter insert 63 a suitable filling material, e.g. gravel with an average size of one or several centimeters can also serve as a relatively coarse prefiltering means upstream of the inlet socket and the pump-attached filter 63 and holds back e.g. leaves, roots, etc., so that only when needed is it necessary to have a further, finer filtering in the vicinity of the filter insert 63 on the pump body. This significantly increases the life of the pump-attached filter media. This may completely obviate the need for additional filtering in the vicinity of the filter housing 63 and therefore the latter can be rendered superfluous. These advantages can also be obtained with the embodiments according to FIGS. 1 and 5. Compared with the variants of FIGS. 1 and 5, the embodiment of FIG. 6 has the advantage that the pump body is still accessible even after the container has been filled with weighting material and can in particular be rotated about its longitudinal axis, so as to optionally bring about an optimum setting of the orientation of the outlet connections. The radially leading away outlet connections 64, 65 are also accessible.

FIG. 7 diagrammatically shows a pond insert 70, in which the pump system, including the standing foot can be constructed precisely as in FIG. 5. However, unlike in FIG. 5, in place of the substantially dimensionally stable basket container 56, which also laterally surrounds the pump, there is a dimensionally variable container 72 in the form of a netting, into which stones 73 and/or gravel etc. can be filled through a filling opening in the lower area of the standing foot means. The netting is fixed to the underside of the standing foot means and can, if required, be folded up or creased and stowed in the reception space 55. When necessary, the netting is filled with weighting material through the openings in the foot area and is optionally closed and e.g. placed in the indicated manner on a non-planar pond bottom 74. By shaking into shape the netting content, the container underside adapts to the loss of the pond bottom and on the top of the netting remote from the bottom it is possible to produce a more or less horizontal surface on which then rests the standing foot of the pump system. As a result of the preferred, firm connection of the netting to the standing platform the stability of the pump system is ensured. It is also possible to use a sack or the like in place of a netting. A pump can be fitted in such a way that its outlet opening is inside or close to the weighting material received. Not only the weighting material, but also the container can fulfil a filtering function and through the construction of the container material and its opening width it is possible to determine the fineness of filtering.

It is obvious to the expert that the advantages resulting from the use of the container as regards stability and optionally filtering and/or esthetic standpoints, can be obtained with any type of pump, i.e. also with pumps having only a single outlet connection. Increased stability containers of the described type can also be advantageous in connection with other functional units insertable in a pond such as filters, nozzles, lights, etc.

What is claimed is:

1. Pond insert device adapted for inserting in a pond, the pond insert device comprising:
    at least one motor-driven pump;
    wherein the pump comprises at least one inlet connection, a first outlet connection, and at least one second outlet connection;
    wherein the first outlet connection and the second outlet connection are adapted for providing different functionality;
    wherein at least one of the outlet connections has a passage cross-section; and
    wherein the passage cross-section of at least one of the outlet connections is variable.

2. Pond insert device according to claim 1, wherein the pump comprises a standing surface and wherein one outlet connection is at least one of oriented and orientable substantially parallel to the standing surface and another outlet connection is at least one of oriented and orientable substantially perpendicular to the standing surface.

3. Pond insert device according to claim 1, wherein the pond insert device comprises a standing surface and wherein at least one of the outlet connections is variably orientable relative to the standing surface.

4. Pond insert device according to claim 1, wherein the pump comprises at least one connection socket and wherein at least one outlet connection comprises an extension which is connected in directionally variable manner to the outlet connection socket.

5. Pond insert device according to claim 4, wherein the outlet socket connection and the extension are connected by means of a water-carrying ball joint.

6. Pond insert device according to claim 1, further comprising a standing foot means associated with the pond insert device and defining a standing surface, wherein the pump is fixed to the standing foot means in a manner which is at least one of detachable and movable.

7. Pond insert device according to claim 6, wherein the standing foot means is constructed in such a manner that the pump is pivotable about a pivoting axis running parallel to the standing surface.

8. Pond insert device according to claim 1, wherein the pump comprises a pump drive creating a flow quantity being discharged out of outlet connections and wherein there are provided means for adjusting the flow quantity of at least one of the outlet connections independently of the pump drive.

9. Pond insert device according to claim 1, further comprising a regulating valve in communication with an outlet connection for varying the passage cross-section of the outlet connection.

10. Pond insert device according to claim 9, wherein the regulating valve has a regulating sleeve adapted to be fitted directly to the outlet connection.

11. Pond insert device according to claim 9, wherein there is provided a line piece connectable to the outlet connection and wherein the regulating valve is adapted to be fitted at a distance from the associated outlet connection to the line piece.

12. Pond insert device according to claim 1, wherein the inlet connection is constructed as an inlet socket provided with one of a screw thread and a coupling connection.

13. Pond insert device according to claim 1, wherein the at least one outlet connection is constructed as an outlet socket provided with one of a screw thread and a coupling connection.

14. Pond insert device according to claim 1, wherein the first and second outlet connections are constructed in intercommunicating manner in such a way that a flow quantity through one of the outlet connections is adjustable by regulating the flow quantity through the other outlet connection.

15. Pond insert device according to claim 1, wherein there is provided an aereating means associated with the pond insert device, the aereating means operating in the manner of a water jet pump and being adapted to be fitted to an outlet connection.

16. Pond insert device according to claim 1, wherein there is provided a fountain associated with the pond insert device and wherein at least one of the outlet connections is adapted to be connected to the fountain.

17. Pond insert device according to claim 1, further comprising at least one container associated with the pond insert device, the container comprising means for connecting the container with the pump and the container being adapted for receiving weighting material for improving the stability of the pond insert device.

18. Pond insert device according to claim 17, wherein the container is a basket.

19. Pond insert device according to claim 17, wherein the pump is installed with respect to the container in such a manner that an area of the inlet connection is positioned substantially within the container.

20. Pond insert device according to claim 17, wherein the pump is installed with respect to the container in such a manner that an area of the inlet connection is positioned substantially facing the container.

21. Pond insert device according to claim 17, wherein the container comprises side walls surrounding at least parts of the pump, wherein the side walls have a height which is adapted to the height of the pump connected to the container in such a way that the pump is substantially completely coverable by weighting material received in the container.

22. Pond insert device according to claim 21, wherein the side walls comprise an upper termination and wherein the upper termination of the side walls is located higher than a top surface of the pump.

23. Pond insert device according to claim 17, wherein the container has a shape which is permanently shape-variable.

24. Pond insert device according to claim 23, wherein the shape-variable container is adapted to be placed at least partly below a standing surface of the pump.

25. Pond insert device according to claim 17, wherein the container is formed by a netting being adapted to be filled with pourable weighting material.

26. Pond insert device according to claim 17, wherein the container has at least one reception device for detacheably fixing a functional unit to the container.

27. Pond insert device according to claim 17, wherein the container is adapted for receiving pourable weighting material.

28. Pond insert device according to claim 27, wherein the pourable weighting material contains at least one of gravel, stones and rocks.

29. Pond insert device according to claim 1, further comprising a filter means positionable upstream of the inlet connection, wherein the filter means comprises at least one container located in an intake area of the inlet connection, the container being adapted for receiving material suitable for filtering of water.

30. Pond insert device according to claim 29, wherein the material suitable for filtering comprises at least one of gravel, stones and rock.

31. Pond insert device according to claim 1, wherein the pond insert device is adapted to be inserted into a garden pond.

32. Pond insert device adapted for inserting in a pond, the pond insert device comprising:

at least one motor-driven pump;

wherein the pump comprises at least one inlet connection, a first outlet connection, and at least one second outlet connection;

wherein the pond insert device comprises a standing surface; and wherein at least one of the outlet connections is variably orientable relative to the standing surface.

33. Pond insert device according to claim 32, wherein the pump comprises at least one connection socket and wherein at least one outlet connection comprises an extension which is connected in directionally variable manner to the outlet connection socket.

34. Pond insert device according to claim 33, wherein the outlet socket connection and the extension are connected by means of water-carrying ball joint.

35. Pond insert device adapted for inserting in a pond, the pond insert device comprising:

at least one motor-driven pump;

wherein the pump comprises at least one inlet connection, a first outlet connection and at least one second outlet connection;

a standing foot means associated with the pond insert device and defining a standing surface, wherein the pump is fixed to the standing foot means in a manner which is at least one of detachable and movable; and wherein the standing foot means is constructed in such a manner that the pump is pivotable about a pivoting axis running parallel to the standing surface.

36. Pond insert device adapted for inserting in a pond, the pond insert device comprising:

at least one motor-driven pump, wherein the pump comprises at least one inlet connection, a first outlet connection and at least one second outlet connection;

wherein the pump comprises a pump drive creating a flow quantity being discharged out of outlet connections; and means for adjusting the flow quantity of at least one of the outlet connections independently of the pump drive.

37. Pond Insert device according to claim 36, wherein an outlet connection has a passage cross-section and wherein the passage cross-section of at least one of the outlet connections is variable.

38. Pond insert device according to claim 37, further comprising a regulating valve in communication with an outlet connection for varying the passage cross-section of the outlet connection.

39. Pond insert device adapted for inserting in a pond, the pond insert device comprising:
at least one motor-driven pump;
wherein the pump comprises at least one inlet connection, a first outlet connection and at least one second outlet connection;
wherein the first and second outlet connections are constructed in an intercommunicating manner so that a flow quantity through one of the outlet connections is adjustable by regulating the flow quantity through the other outlet connection.

40. Pond insert device adapted for inserting in a pond, the pond insert device comprising:
at least one motor-driven pump;
wherein the pump comprises at least one inlet connection, a first outlet connection and at least one second outlet connection; and
at least one container associated with the pond insert device;
wherein the container comprises means for connecting the container to the pump;
wherein the container is adapted for receiving weighting material for retaining the pond insert device on the pond floor.

41. Pond insert device according to claim 40, wherein the container is adapted for receiving pourable weighting material.

42. Pond insert device according to claim 41, wherein the pourable weighting material contains at least one of gravel, stones and rocks.

43. Pond insert device according to claim 42, wherein the container is a basket.

44. Pond insert device according to claim 40, wherein the pump is installed with respect to the container in such a manner that an area on the inlet connection is positioned substantially within the container.

45. Pond insert device according to claim 40, wherein the pump is installed with respect to the container in such a manner that an area of the inlet connection is positioned substantially facing the container.

46. Pond insert device according to claim 40, wherein the container comprises sidewalls surrounding at least parts of the pump, wherein the side walls have a height which is adapted to the height of the pump connected to the container in such a way that the pump is substantially completely covetable by weighting material received in the container.

47. Pond insert device according to claim 46, wherein the side walls comprise an upper termination and wherein the upper termination of the side walls is located higher than a top surface of the pump.

48. Pond insert device according to claim 40, wherein the container has a shape which is permanently shape-variable.

49. Pond insert device according to claim 48, wherein the shape-variable container is adapted to be placed at least partly below a standing surface of the pump.

50. Pond insert device according to claim 40, wherein the container is formed by a netting being adapted to be filled with pourable weighting material.

* * * * *